United States Patent [19]

Na

[11] Patent Number: 5,430,593
[45] Date of Patent: Jul. 4, 1995

[54] HEAD CLEANING DEVICE UTILIZING A CLEANING RIBBON

[75] Inventor: Jai-Gon Na, Seoul, Rep. of Korea

[73] Assignee: Daewoo Electronics Co., Ltd., Seoul, Rep. of Korea

[21] Appl. No.: 294,452

[22] Filed: Aug. 23, 1994

[30] Foreign Application Priority Data

Aug. 24, 1993 [KR] Rep. of Korea .................... 93-16477

[51] Int. Cl.$^6$ .............................................. G11B 5/10
[52] U.S. Cl. ................................................... 360/128
[58] Field of Search ........................................ 360/128

[56] References Cited

FOREIGN PATENT DOCUMENTS 59-186116  4/1983  Japan ................................. 360/128
3-178019  12/1989  Japan ................................. 360/128

Primary Examiner—A. J. Heinz
Attorney, Agent, or Firm—Anderson Kill Olick & Oshinsky

[57] ABSTRACT

A head cleaning device for use in tape recorder comprises a cleaning ribbon intermittently fed within a cleaner housing or cleaner cartridge rotatably mounted on a deck to thereby have an unused tape portion to be slidingly engaged with the head in its every cleaning operation. In order to feed the cleaning ribbon by a pitch within the housing, the inventive head cleaning device utilizes two gears adapted to be rotated by a pawl mounted on a pole base of the tape recorder. As a result, the present invention may increase the cleaning efficiency without a reverse-pollution due to a polluted cleaning media.

5 Claims, 2 Drawing Sheets

HEAD CLEANING DEVICE UTILIZING A CLEANING RIBBON

FIELD OF THE INVENTION

The present invention is directed to a head cleaning device for a tape recorder; and, more particularly, to an improved device for cleaning a magnetic head of a head drum assembly through the use of a cleaning ribbon contained in and partially exposed from a cleaner cartridge that can be subjected to a pivotal movement toward and away from the magnetic head at each occurrence of the cleaning operation.

DESCRIPTION OF THE PRIOR ART

Most of today's video cassette recorders are provided with a rotary head drum assembly mounted on the deck or main chassis thereof and at least one magnetic head circumferentially disposed along the periphery of the head drum assembly for recording or reproducing signals on or from a travelling magnetic tape.

Due to the extreme sensitivity to dusts, motes and other particles, the magnetic head need be kept clean and uncontaminated throughout its service life or otherwise it becomes difficult to maintain the quality of signal recording and reproduction. For in reason, needs have continued to exist for a cleaning device capable of keeping the magnetic head free from contamination.

To meet the need, U.S. Pat. No. 4,811,149 issued to E. Clausen discloses a cleaner cassette which contains a cleaning ribbon wound around supply and take-up reels. The cleaner cassette is manually loaded into a video cassette player/recorder to thereby permit its cleaning ribbon to come into contact with the head drum in the same manner as the magnetic tape of the conventional video cassette does. As a result, the cleaner cassette requires the user's intervention each time the magnetic head is to be cleaned for the loading of the cleaner cassette into the video cassette recorder. In addition to the above inconvenience, it requires extra efforts to carry out the cleaning operation on a periodical and frequent basis.

Another common type of prior art head cleaning device is the lever and roller type cleaner illustrated in FIG. 1, which comprises a swingable lever 4 pivotally mounted on the deck of a video cassette recorder and a cleaning roller 5 rotatably supported at one end of the swingable lever 4. The cleaning roller 5 is designed to come into rolling contact with the head drum 2 as the swingable lever 4 moves from a release position to an engagement position. The swingable lever 4 remains biased toward the head drum 2 by a torsion spring 6 so that the cleaning roller 5 maintains the contact with the head drum 2. Movement toward the release position of the swingable lever 4 is caused by a triggering finger 7 which is operatively connected to a cam gear (not shown).

The shortcomings inherent in the cleaning device of FIG. 1 are basically two fold. First of all, the cleaning roller does not allow itself to be used for an extended period of service time because it tends to be heavily contaminated with, e.g., dusts, over time, thereby becoming unusable. Secondly, since the cleaning roller makes a rolling contact with the head drum rather than a sliding contact, the efficiency of the cleaning operation tends to be compromised.

SUMMARY OF THE INVENTION

It is, therefore, an object of the present invention to provide a head cleaning device capable of automatically cleaning the magnetic head of a tape recorder on a periodical basis without resort to the user's intervention.

Another object of the invention is to provide a head cleaning device which can perform its cleaning operation for an extended period of service time with a high degree of cleaning efficiency.

These and other objects of the present invention are accomplished by employing an inventive head cleaning device adapted to provide pivotal movement toward and away from the head drum, said head cleaning device comprising: a cleaner housing pivotably mounted adjacent to the head drum, the cleaner housing having a frontal opening and a tail finger; a supply roll rotatably held in place within the cleaner housing, the supply roll having multiple turns of cleaning ribbon to be fed to the frontal opening of the cleaner housing; a guide roller fitted at the frontal opening in a parallel relationship with respect to the head drum and at least partially protruding outside the cleaner housing, the cleaning ribbon adapted to travel around the guide roller as it is fed from the supply roll; means for intermittently pulling the cleaning ribbon to have a predetermined length of the cleaning ribbon freshly exposed to the outside of the housing at the frontal opening each time the pulling operation occurs; and means for causing the cleaner housing to pivot between an engagement position where the cleaning ribbon comes onto contact with the head drum and a release position where the cleaning ribbon becomes out of contact with the head drum.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 2:
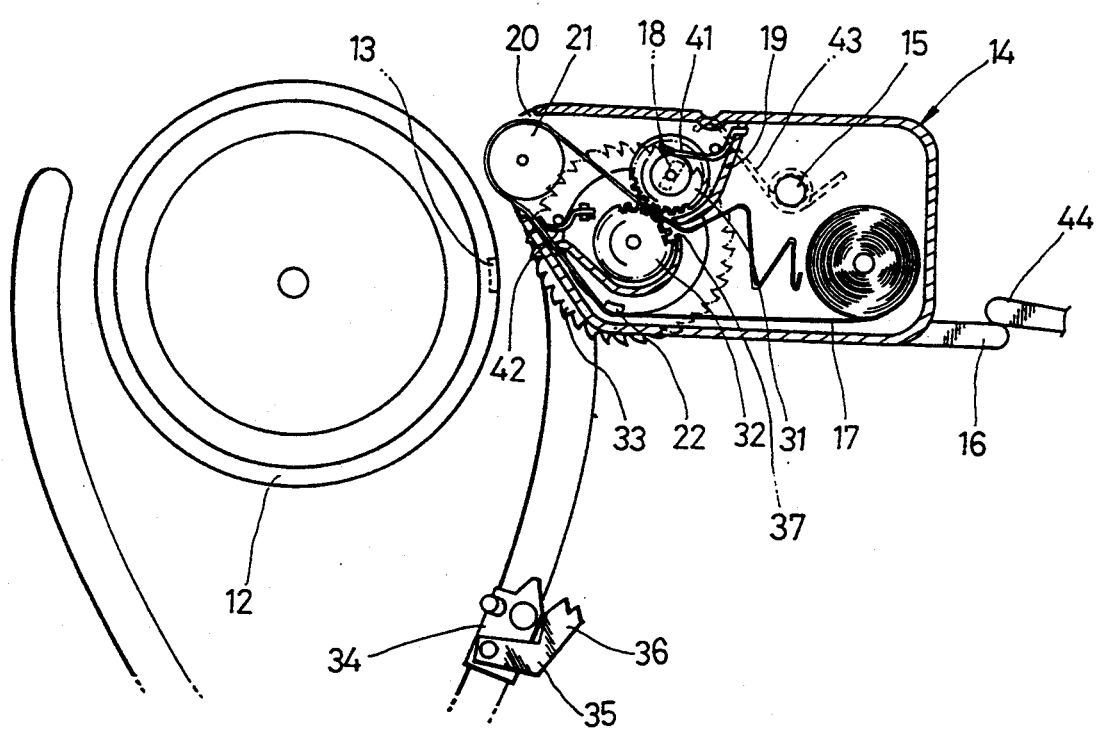
FIG. 2 is a plan view of a head cleaning device in accordance with the present invention at its rest position.

Referring to FIG. 2, there is shown a head cleaning device in accordance with the present invention at its rest position. As shown, a cleaner housing 14 having a frontal opening 20 and a tail finger 16 is pivotably mounted on a deck, adjacent to a head drum assembly 12. The frontal opening portion 20 of the housing 14 is biased toward the head drum assembly 12 by a torsion spring 43 placed around a boss member 15 thereof. The cleaner housing 14 contains a cleaning ribbon 17 for wiping a head 13. Said cleaning ribbon 17 is fed within the housing 14 by a pair of drive and driven gears 32 and 31 pitch by pitch, after each cleaning operation. Feeding path of the cleaning ribbon is defined by a guide roller 21 and a guide member 22 within the housing 14.

The guide roller 21 is rotatably mounted adjacent to the frontal opening 20 of the housing 14 in a parallel relationship with respect to the head drum 12 and partially exposed outside the housing 14.

The driven and drive gears 31 and 32 for feeding the cleaning ribbon is adapted to mesh with each other. The driven gear 31 is movably installed in a slot 18 of the housing 14 and normally biased against the drive gear 32 by a torsion spring 41. The drive gear 32 is united with a ratchet wheel 33 coaxially mounted thereon. The cleaning ribbon 17 is retained between the two gears 31 and 32 resiliently meshed each other and fed by rotation of the ratchet wheel 33 integrated with the drive gear 32 within the housing 14.

The rotation of the ratchet wheel 33 is triggered by a pawl 35 which is mounted on the pole base 34. The ratchet wheel 33 is pivoted by the pawl 35 at a predetermined angular extent whenever the pole base 34 moves toward the head drum 12 to load the magnetic tape(not shown)onto the head drum 12. Though the pawl 35 is shown to have two teeth at its leading portion in the drawings, the number of teeth is not limited to 2 in accordance with the present invention.

On the other hand, the cleaner housing 14 is provided with a tension spring 42 adjacent to the frontal opening 20, which depresses the tape 17 against the housing wall to thereby cause the tape 17 to be tensioned lengthwise. Moreover, a partition wall 19 bisecting the cleaner housing 14 is formed to define spaces for keeping the pair of drive and driven gears 32 and 31 from getting tangled with the cleaning ribbon 17. The partition wall 19 has a slot through which the cleaning ribbon 17 issuing from a nip of the drive and driven gears 32 and 31 is introduced into a ribbon storage space.

Figure 1:
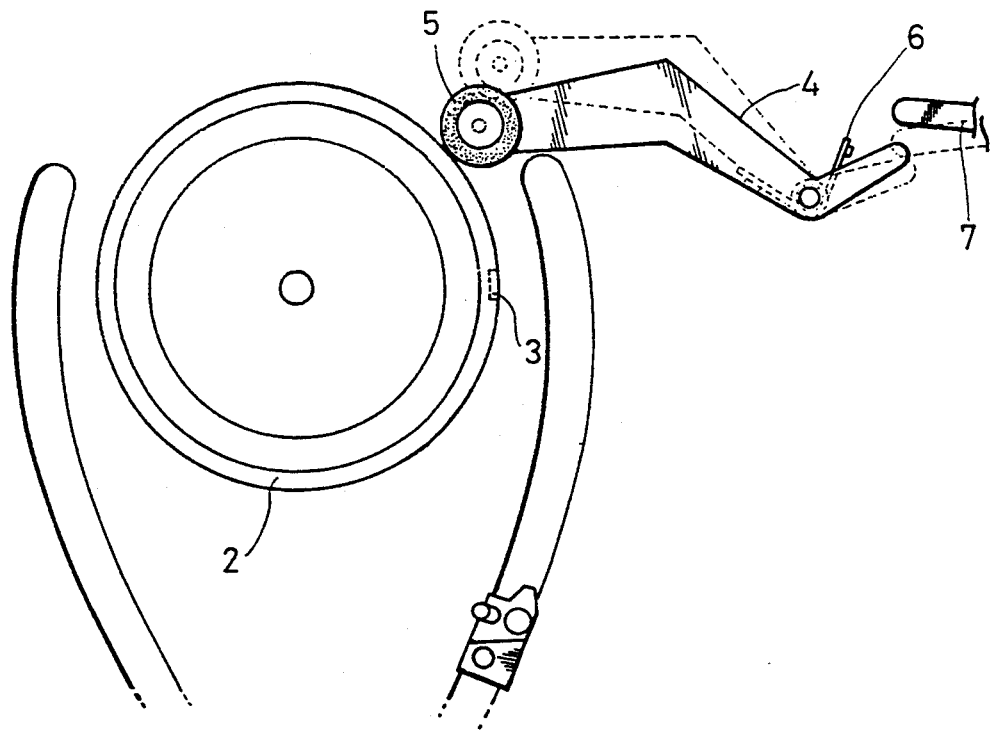
FIG. 1 is a schematic top view showing one of the prior art head cleaning devices.

On the deck opposed to the head drum assembly 12, a release lever 44 driven by a cam gear(not shown)is placed so that it cause the guide roller 21 to be disengaged from the head drum 12 by depressing the tail finger 16 during the non-operating period of the cleaning device. However, it should be understood that said release lever 44 and the tail finger 16 are well known to those skilled in the art and similar to those in FIG. 1.

Figure 3:
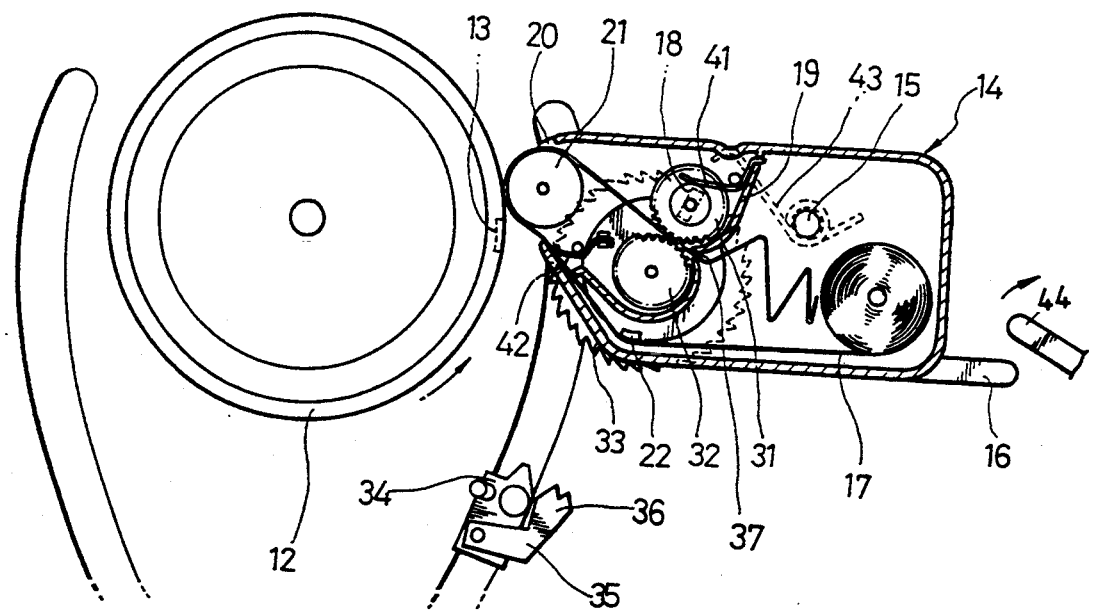
FIGS. 3 and 4 are similar to FIG. 2, but each showing the head cleaning device at the engagement and the release position, respectively.
Figure 4:
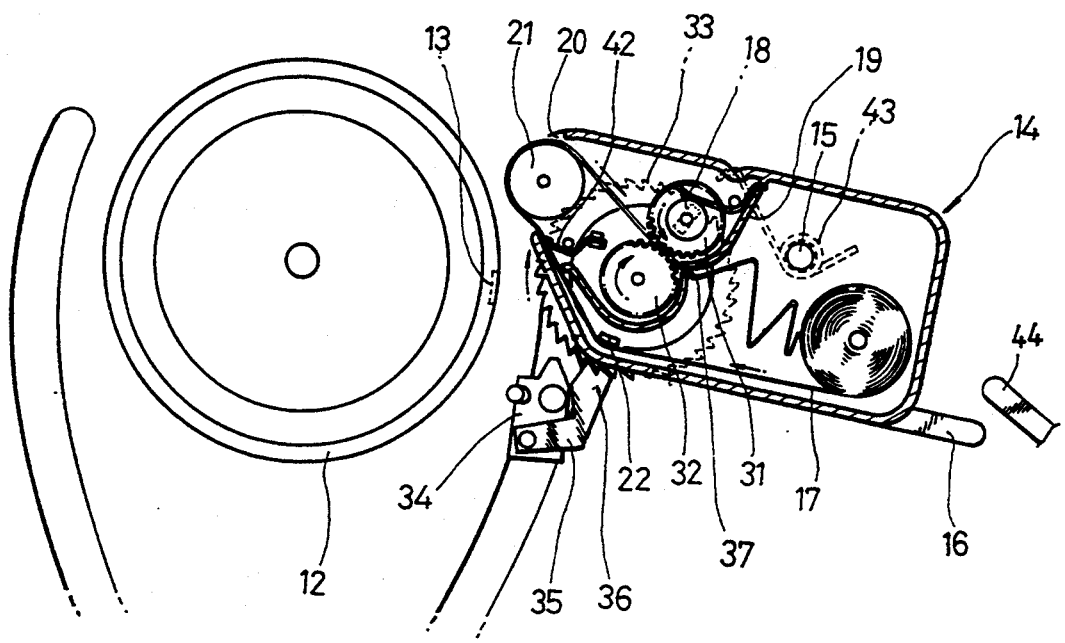

Operation of the inventive head cleaning device will now be described with reference to FIGS. 2, 3 and 4.

While the head cleaning device is resting or not in use as illustrated in FIG. 2, the guide roller 21 is kept off the head drum 12 by the depression of the release lever 44. Under this condition, if the tape recorder is energized, the pole base 34 driven by a cam gear(not shown) starts toward the head drum 12 to load the magnetic tape out of the cassette onto the head drum 12, as best illustrated in FIG. 3. Concurrently, the release lever 44 retreats from the tail finger 16 by, e.g., connecting the pole base and the release lever through a link to thereby permit the cleaner housing 14 to be resiliently biased against the head drum 12.

At that moment, the cleaning ribbon 17 kept on the surface of the guide roller 21 comes into contact with the head drum 12 rotating at a high speed to thereby remove deposits or contaminants off the head 13 positioned at a periphery of the head drum 12. The cleaning ribbon 17 is preferably made of a material having a light coefficiency of friction, e.g., felt. The tension spring 42 prevents the slippage of the cleaning ribbon 17 that may occur on the surface of the guide roller 21 owing to the friction force between the head drum 12 and the cleaning ribbon 17 during the cleaning action.

The cleaning ribbon 17 works until the pawl 35 secured to the pole base 34 meshedly pushes the ratchet wheel 33 to thereby detach the guide roller 21 from the head drum 12. As best depicted in FIG. 4, further advance of the pawl 35 rotates the ratchet wheel 33, said rotation of the ratchet wheel 33 in turn causing the cleaning ribbon 17 to be fed within the housing 14. As a result, a fresh unused portion of the ribbon portion come into stand-by state for a next cleaning operation.

Although the invention has been shown and described with respect to the preferred embodiments, it will be understood by those skilled in the art that various changes and modifications may be made without departing from the spirit and scope of the invention as defined in the following claims.

What is claimed is:

1. A tape recorder having a rotary head drum and a head cleaning device adapted for pivotal movement toward and away from the head drum, said head cleaning device comprising:

a cleaner housing pivotably mounted adjacent to the head drum, the cleaner housing having a frontal opening and a tail finger;

a supply roll rotatably held in place within the cleaner housing, the supply roll having multiple turns of cleaning ribbon to be fed to the frontal opening of the cleaner housing;

a guide roller fitted at the frontal opening in a parallel relationship with respect to the head drum and at least partially protruding outside the cleaner housing, the cleaning ribbon adapted to travel around the guide roller as it is fed from the supply roll;

means for intermittently pulling the cleaning ribbon to have a predetermined length of the cleaning ribbon freshly exposed to the outside of the housing at the frontal opening each time the pulling operation occurs; and means for causing the cleaner housing to pivot between an engagement position where the cleaning ribbon comes into contact with the head drum and a release position where the cleaning ribbon is out of contact with the head drum.

2. The tape recorder as recited in claim 1, wherein the pulling means includes: a pair of drive and driven gears meshing with each other to pinch the cleaning ribbon therebetween, the driven gear movable away from and normally biased toward the drive gear; a ratchet wheel coaxially mounted for rotation with the drive gear as a unit; and means for causing the ratchet wheel to rotate a predetermined angular extent at a time.

3. The tape recorder as recited in claim 2, wherein said means for causing the ratchet wheel to rotate includes a pawl carried by a pole base slidably mounted on a deck of the tape recorder.

4. The tape recorder recited in claim 1, wherein said means for causing the cleaner housing to pivot includes a torsion spring normally biasing the cleaner housing toward the head drum and a release lever selectively operable to depress the tail finger of the cleaner housing to thereby cause the cleaner housing to move away from the head drum.

5. The tape recorder as recited in claim 1, further comprising a barrier wall bisecting the cleaner housing to define a ribbon storage chamber, the barrier wall having a slot through which the cleaning ribbon issuing from a nip of drive and driven gears is introduced into the ribbon storage chamber.

* * * * *